United States Patent [19]
Nishiki

[11] Patent Number: 5,038,369
[45] Date of Patent: Aug. 6, 1991

[54] X-RAY FLUOROSCOPIC APPARATUS

[75] Inventor: Masayuki Nishiki, Ootawara, Japan

[73] Assignee: Kabushiki Kaisha Toshiba, Kawasaki, Japan

[21] Appl. No.: 450,227

[22] Filed: Dec. 13, 1989

[30] Foreign Application Priority Data

Dec. 19, 1988 [JP] Japan .................................. 63-319814

[51] Int. Cl.⁵ ............................................ G01N 23/04
[52] U.S. Cl. ........................................ 378/62; 378/22;
378/162; 378/99; 378/4; 358/111; 358/213.16;
250/370.09
[58] Field of Search ...................... 378/62, 22, 162, 99;
250/370.09; 358/213.15, 213.16, 213.27, 213.28,
111, 280

[56] References Cited
U.S. PATENT DOCUMENTS

| 4,179,711 | 12/1979 | Nagumo | 358/213.17 |
|---|---|---|---|
| 4,216,503 | 8/1980 | Wiggins | 358/280 |
| 4,485,480 | 11/1984 | Kohno et al. | 378/4 |
| 4,554,453 | 11/1985 | Feigt et al. | 250/370.09 |
| 4,602,291 | 7/1986 | Temes | 358/213.16 |
| 4,811,105 | 3/1989 | Kinoshita et al. | 358/213.16 |
| 4,821,108 | 4/1989 | Barbagelata et al. | 358/282 |
| 4,839,729 | 6/1989 | Ando et al. | 358/213.16 |

Primary Examiner—Edward P. Westin
Assistant Examiner—Kim-Kwok Chu
Attorney, Agent, or Firm—Finnegan, Henderson, Farabow, Garrett, and Dunner

[57] ABSTRACT

An X-ray fluoroscopic apparatus comprises an X-ray tube for emitting X-rays to an object to be examined, an image intensifier for converting an X-ray image of the object to an optical image, a TV camera for picking up the optical image through a light-tight optical system coupled to the output portion of the image intensifier, an A/D converter for converting an output analog signal of the TV camera to a digital image signal, a selector for outputting the output of the A/D converter to its first and second outputs, an offset memory connected to the first output terminal of the selector, a subtracter for subtracting the output of the offset memory from the second output terminal of the selector, and an image memory to which the output of the subtracter is supplied. When no X-rays are emitted, the selector is connected to the side of the first terminal and an offset signal for each of pixels for one frame output from the TV camera is written into the offset memory. When X-rays are emitted, the selector is connected to the side of the second terminal and the output of the offset memory is subtracted from the X-ray image signal by the subtracter so that an offset-compensated image signal for each of pixels is stored in the image memory.

13 Claims, 5 Drawing Sheets

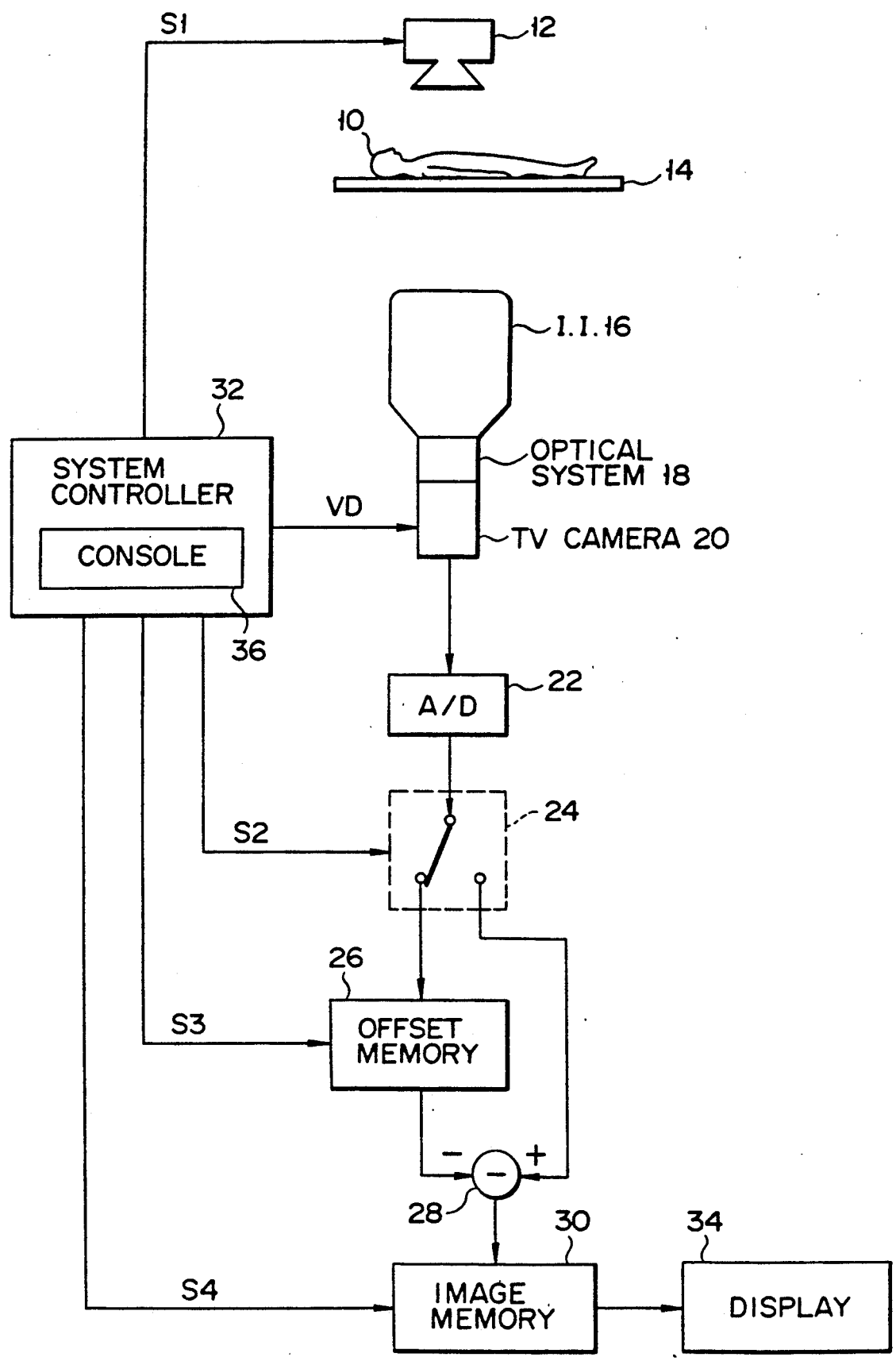
F I G. 3

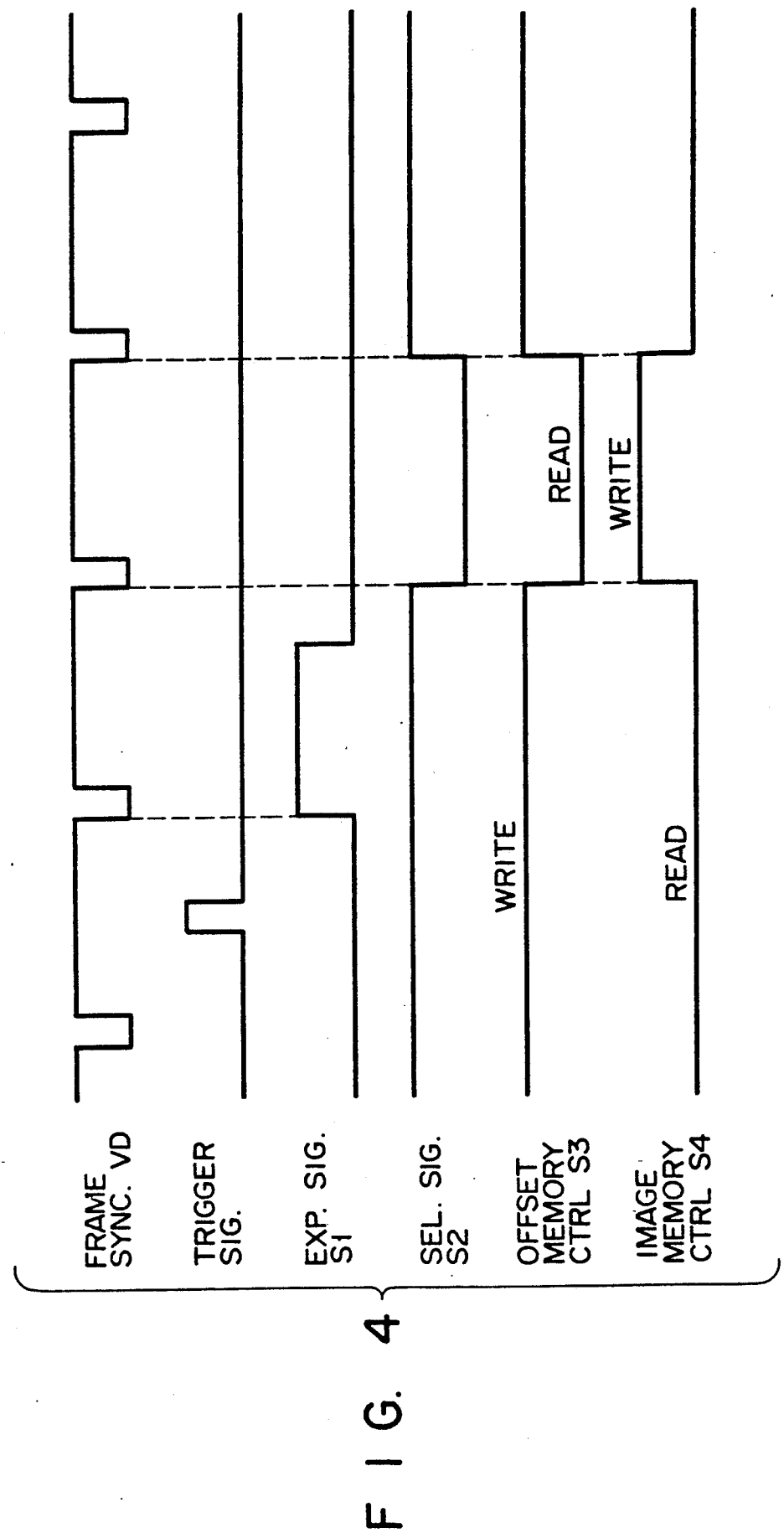
F I G. 4

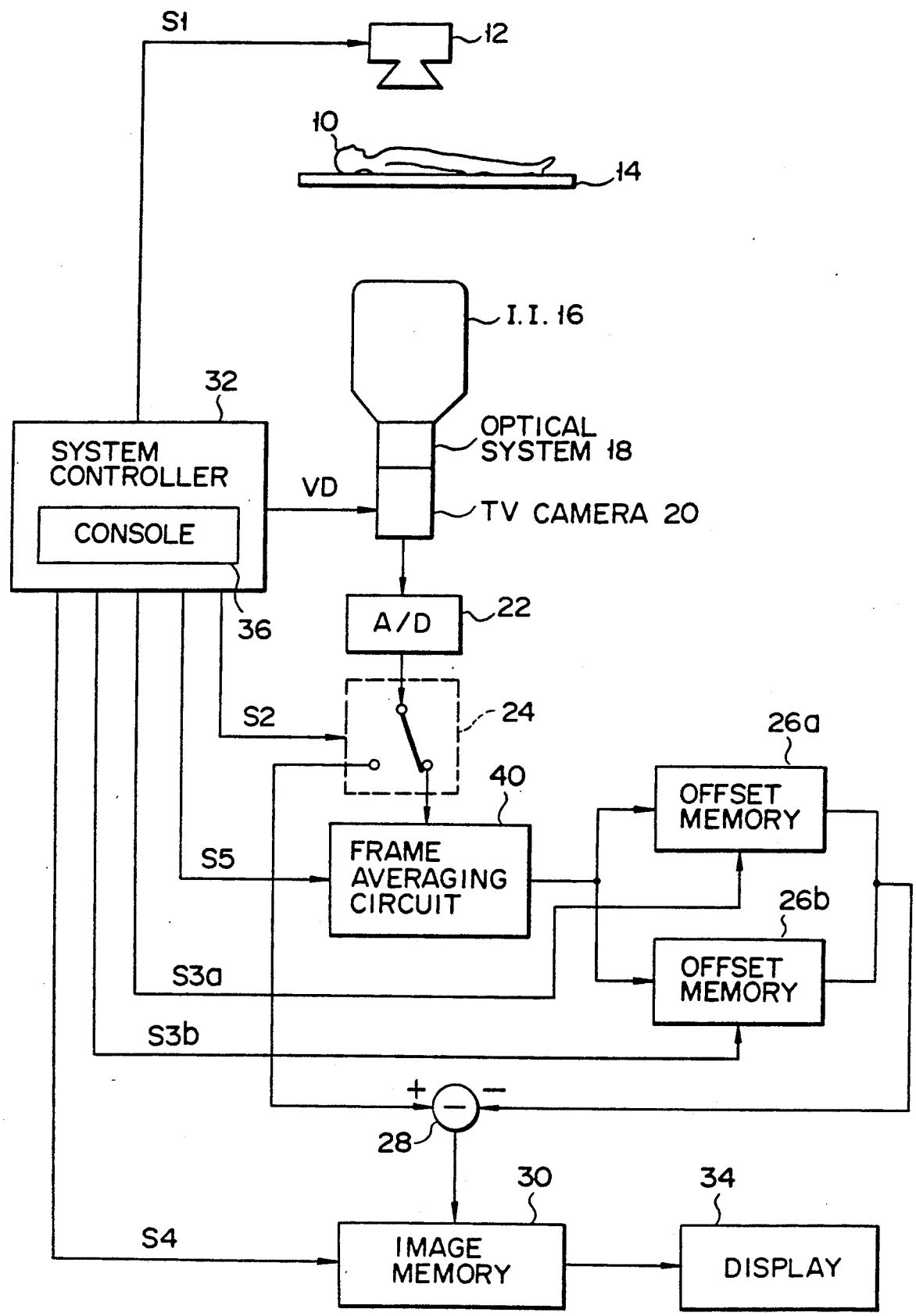
F I G. 5

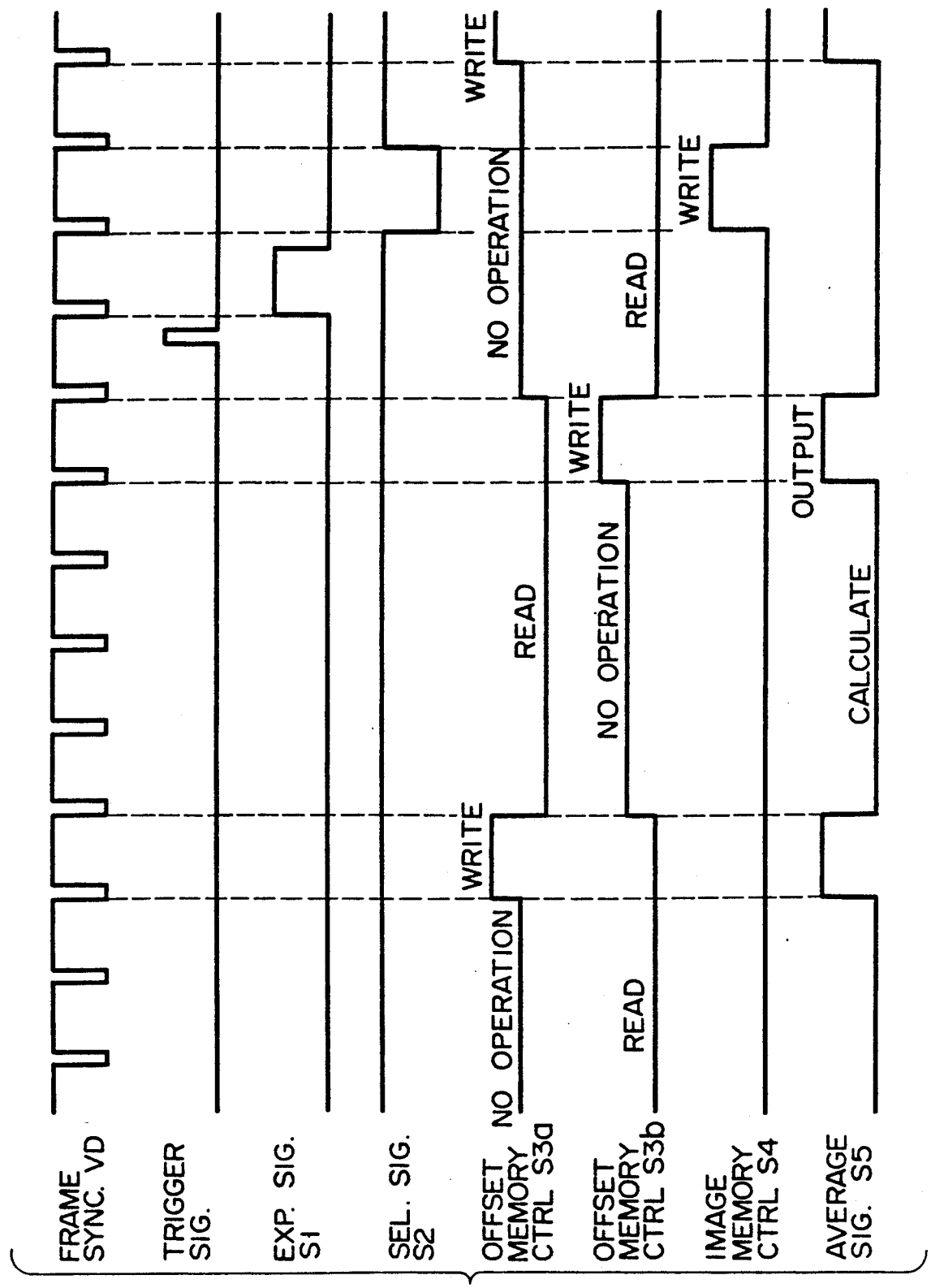
F I G. 6

X-RAY FLUOROSCOPIC APPARATUS

BACKGROUND OF THE INVENTION

1. Field of the Invention

The present invention relates to an image pickup camera for use with an X-ray fluoroscopic apparatus and, more particularly, to offset compensation thereof.

2. Description of the Related Art

There is an X-ray fluoroscopic apparatus which converts an X-ray image of an object under examination irradiated with X-rays emitted from an X-ray tube into an optical image by use of an image intensifier, picks up the optical image with a television camera, and visually displays the fluoroscopic image output from the television camera on a display. In recent years, in television cameras, solid-state pickup devices using CCDs (charge coupled devices) or MOSs (metal oxide semiconductors) have been replacing conventional image pickup tubes.

FIG. 1 illustrates a schematic arrangement of a CCD solid-state pickup device of an interline system as an example of such solid-state pickup devices. A large number of light receiving elements 90 formed of photodiodes are arrayed two-dimensionally. Part of the light receiving elements, in this example, the leftmost column 90a to which hatching is made (plural columns may be used), is shielded from light to determine the level of an offset signal and is thus referred to as an optical black portion. Vertical transferring CCDs 92 are provided to the left of respective columns of light receiving elements including the optical black column 90a and outputs of all the vertical transferring CCDs 92 are coupled to a horizontal transferring CCD 94. Vertical transferring CCDs 92 and horizontal transferring CCD 94 are also shielded from light. Outputs of all the light receiving elements 90 are transferred to corresponding vertical of repeated vertical transfer and horizontal transfer, an output image signal from horizontal transferring CCD 94 is applied to a succeeding display and so on via a buffer 96.

Light receiving element 90 may produce some amount of signal (offset signal) while it receives no light. For obtaining a true image signal, therefore, it is required to subtract the offset signal from the output of buffer 96. Subtracting the offset signal from the camera output is called the offset compensation. For the offset compensation, as shown in FIG. 2, the level Vb of an offset signal from optical black portion 90a which appears at the beginning of each horizontal scanning line signal is sampled and held to subtract the hold value from the succeeding horizontal scanning line signal.

Heretofore, as described above, an offset signal is obtained for each horizontal scanning line and the offset signal is subtracted from a signal of each of pixels on the horizontal scanning line for the offset compensation. However, the offset component varies from pixel to pixel because of variations in manufacturing of the light receiving elements. With the conventional compensating method, therefore, there is a problem of impossibility of accurate compensation for each pixel.

The above description was given of a solid state pickup device. The same problem may arise with image pickup tubes because of variations in coating of a photoelectric film on a photoelectric surface. The same may be said of any applications of the image pickup camera, other than medical apparatus such as a fluoroscopic apparatus.

SUMMARY OF THE INVENTION

It is an object of the present invention to provide an image pickup camera which permits accurate compensation of an offset component.

According to the present invention, there is provided an image pickup camera comprising a memory for storing, as an offset signal, a frame of image signals obtained under the condition of no incidence of light to the camera and a subtracter for subtracting the offset signal stored in the memory from a frame of image signals obtained by picking up a desired object.

Thereby, a corresponding offset signal component can be subtracted from each image signal component for one frame, always permitting accurate offset compensation.

BRIEF DESCRIPTION OF THE DRAWINGS

FIG. 3 is a block diagram of an X-ray fluoroscopic apparatus to which an image pickup camera according to a first embodiment of the present invention is applied;

FIG. 4 is a timing diagram for explaining the operation of the X-ray fluoroscopic apparatus of FIG. 3;

FIG. 5 is a block diagram of an X-ray fluoroscopic apparatus to which an image pickup camera according to a second embodiment of the present invention is applied; and FIG. 6 is a timing diagram for explaining the operation of the X-ray fluoroscopic apparatus of FIG. 5.

DETAILED DESCRIPTION OF THE PREFERRED EMBODIMENTS

Figure 1:
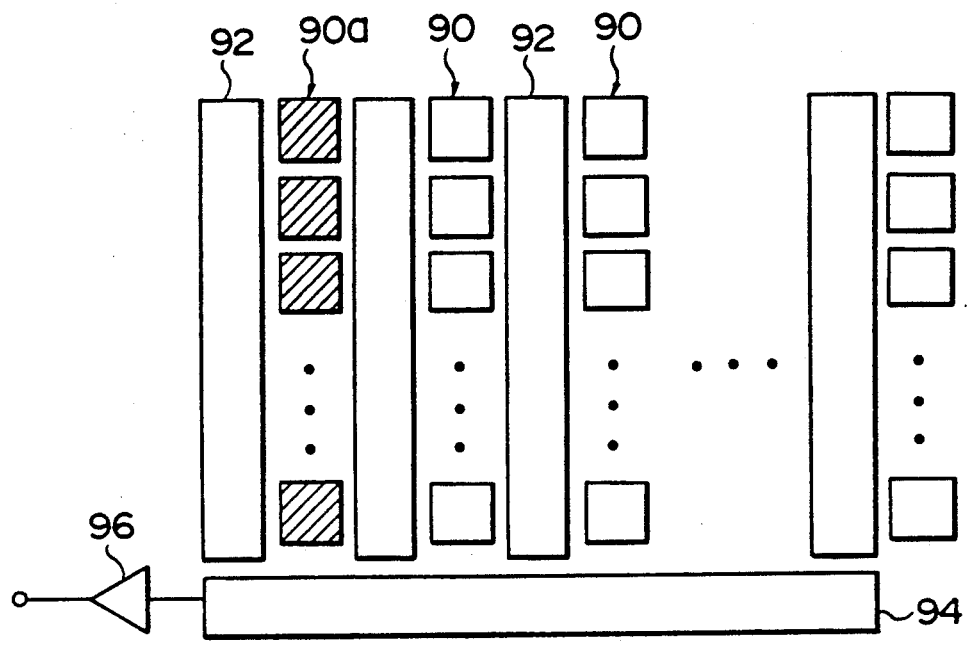
FIG. 1 is a schematic diagram of a prior art solid-state image pickup device.
Figure 2:
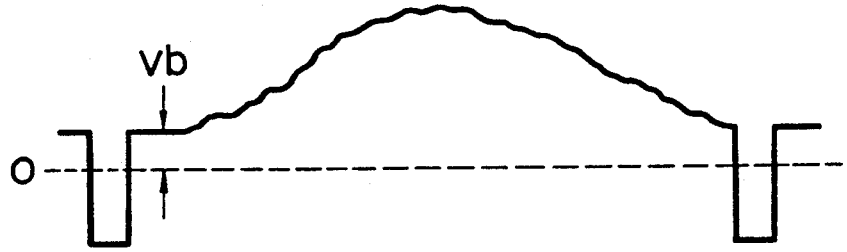
FIG. 2 shows an output signal waveform of the solid-state image pickup device of FIG. 1.

Referring now to FIG. 3, there is illustrated an X-ray fluoroscopic apparatus according to a first embodiment of the present invention in which an X-ray tube 12 is disposed over a couch 14 on which an object 10 to be examined lies and X-rays emitted from X-ray tube 12 are directed to object 10. Under couch 14 is disposed an image intensifier (I.I.) 16 for converting an X-ray image resulting from the X-rays transmitted through the object 10 into an optical image which represents X-ray absorption coefficients of various tissues irradiated with X-rays. The optical image is directed to a TV camera 20 via a light-tight optical system 18 directly coupled to the output surface of image intensifier 16. Television camera 20 produces an analog image signal representing the X-ray image of a portion of the object that is irradiated with X-rays. Since the output surface of image intensifier 16 and the input surface of TV camera 20 are coupled to each other through light-tight optical system 18 as described above, the input surface of TV camera 20 is quite dark and thus no signal is to be output from TV camera 20 when the X-rays are not emitted from X-ray tube 12. As described in connection with the prior art, however, some amount of signal will be produced even under that condition because of an offset signal contained in the output of TV camera 20. As TV camera 20 a solid-state image pickup device such as a CCD camera is generally used, which may be of a type as shown in FIG. 1. However, the optical black portion is not needed as will be described later. An image pickup tube may be used instead of a solid-state pickup device for the TV camera. X-ray tube 12, image intensifier 16, optical system 18 and TV camera 20 are disposed in alignment and moreover can be disposed in any direction in order to take X-ray fluorography of the object from any direction.

The analog image signal output from TV camera 20 is converted to a digital image signal by an A/D converter 22. The output signal of A/D converter 22 is applied to an offset memory 26 or a first input (+) of a subtracter 28 via enough selector 24. Offset memory 26 has a storage capacity to store an output signal of TV camera 20 corresponding to one frame. Selector 24 is controlled by a system controller 32 which supplies an X-ray emission start signal S1 to X-ray tube 12 and a frame sync. signal VD to TV camera 20, writes an offset signal obtained when X-rays are not emitted into offset memory 26, and applies a digital image signal resulting from emission of X-rays to the first input (+) of subtracter 28. To a second input (−) of subtracter 28 is coupled the output of offset memory 28. The read/write of offset memory 26 is also controlled by system controller 32.

Subtracter 28 subtracts the input to its second input (−) from the input to its first input (+) and then outputs the result of subtraction to an image memory 30. The read/write of image memory 30 is also controlled by system controller 32. The output of image memory 30 is visually displayed on a display device 34 or recorded on a large capacity storage medium. System controller 32 has a console 36 for entering various instructions and produces various control signals VD and S1 to S4 corresponding to the instructions entered. When X-rays are not emitted from X-ray tube 12, system controller 32 switches selector 24 to the side of offset memory 26 and places offset memory 26 in a write mode. At the time of emitting of X-rays, system controller 32 switches selector 24 to the side of subtracter 28 and places offset memory 26 in a read mode. Image memory 30 is placed in a write mode only when offset memory 26 is placed in a read mode.

The operation of the first embodiment will be described with reference to a timing diagram shown in FIG. 4.

A case where X-rays are not emitted from X-ray tube 12 will be described first. In this case a offset signal is output from TV camera 20 as described above. System controller 32 causes control signal S2 to go to a high level so as to connect the output of A/D converter 22 to offset memory 26 and causes control signal S3 to go to a high level so as to set offset memory 26 to a write mode. As a result, the offset signal is written into offset memory 26. Offset memory 26 has a capacity to store an image signal for one frame so that the contents of offset memory 26 is rewritten and thus an offset signal for the latest frame is stored in memory 26. A control signal S4 to image memory 30 is at a low level so that it is set to a read mode in which the output of subtracter 28 cannot be written into it.

A case where X-rays are emitted from X-ray tube 12 will be described next. Upon the generation of a trigger signal through an operation on console 36, system controller 32 supplies to X-ray tube 12 an exposure control signal S1 of a predetermined duration (less than the period of one frame) in synchronization with the next frame sync. signal VD. X-rays are emitted from X-ray tube 12 during the duration of the exposure control signal S1. An X-ray fluoroscopic image of object 10 is converted to an optical image by image intensifier 16, which enters TV camera 20 through optical system 18 to be stored in the light receiving portion. During the interval when X-rays are emitted a signal output from TV camera 20 is the signal which has been obtained before the emission of X-rays so that selector 24 and memories 26 and 30 remain as before.

After the termination of emission of X-rays, system controller 32 switches the levels of selector switching signal S2 and memory mode control signals S3 and S4 in synchronism with the next frame sync. signal VD. As a result, the digital image signal output from A/D converter 22 is applied to the first input (+) of subtracter 28 and offset memory 26 is set to a read mode so that the stored offset signal is supplied to the second input (−) of subtracter 28. Subtracter 28 subtracts the offset signal from the X-ray fluoroscopic signal output from TV camera 20 Offset signal components for pixels are read from offset memory 26 in the same order as that in which they are written in synchronism with the frame sync. signal so that a subtraction is made between an image signal and an offset signal for a corresponding pixel. Thus a true image signal is written into image memory 30.

When the frame interval terminates, control signals S2, S3, and S4 are switched again so that an offset signal is written into memory 26. The contents of offset memory 26 are updated to store the newest offset signal.

As described above, according to the embodiment, the outputs of TV camera 20 representing offset signals for respective pixels are always written into offset memory 26 when X-rays are not emitted from X-ray tube 12 so as to store the newest offset signal for each of pixels in memory 26, and an offset signal is subtracted from an image signal for one frame obtained when X-rays are emitted for each of pixels so as to write the results of subtraction into image memory 30, thereby allowing the offset signal to be eliminated for each of pixels within one frame and accurate offset compensation to be made for each of pixels. Since the signal output from the TV camera when no optical image is applied thereto before the emission of X-rays is stored in a frame memory as an offset signal, there is no need of provision of the optical black portion in the light receiving section of an image pickup device, thus permitting effective utilization of the light receiving section of the image pickup device.

FIG. 5 is a block diagram of a second embodiment of the X-ray fluoroscopic apparatus. Distinct from the first embodiment, the second embodiment is provided with two offset memories 26a and 26b (of the same function as offset memory 26) in place of offset memory 26 and a frame averaging circuit 40 having an input connected to the output of selector 24 and an output connected to inputs of offset memories 26a and 26b. The outputs of offset memories 26a and 26b are connected to the second input (−) of subtracter 28.

Frame averaging circuit 40 adds together offset signals of a predetermined frame output from A/D converter 22 and averages the results of addition to obtain an average value of the offset signals of the predetermined frame. With the first embodiment, use is made of the newest one frame of image signal as an offset signal when no X-rays are emitted. The offset signal may contain noise. Hence, the subtraction of the offset signal from image signals still containing noise ma increase random noise. With the second embodiment, therefore, in order to avoid an increase in random noise due to offset compensation, the offset signals are averaged so that the offset signal may contain no noise.

The operation of the second embodiment will be described with reference to a timing diagram shown in FIG. 6. In the present case, it is assumed that frame averaging circuit 40 obtains a mean value of the offset signals for each of pixels over four frames of the offset signals. It is further assumed that an arithmetic mean value is obtained over four frame intervals and the mean value is output during the next frame interval. For this reason, control signal S5 applied from system controller 32 to frame averaging circuit 40 has one cycle of five frame intervals; the first four frame intervals of which specify the calculation of arithmetic mean and the last frame interval of which specifies outputting of the resultant mean value. Switching signal S2 to selector 24 is at a high level at the time of no emission of X-rays as is the case with the first embodiment so that the output of A/D converter 22 is coupled to frame averaging circuit 40. Notwithstanding frame averaging circuit 40 has different intervals, one for calculating the average value and the other for outputting the average value, two offset memories 26a and 26b are provided to allow X-rays to be emitted in any of frames. That is, the output of frame averaging circuit 40 is alternately written into offset memories 26a and 26b. To this end, system controller 32 sets offset memories 26a and 26b in turn to a write mode every time an average value is output from frame averaging circuit 40 (at intervals of five frames). The average values of offset signals over four frames written into each of offset memories 26a and 26b are read over the next five frames (including the interval in which the next average value is obtained and the interval in which the average value is output to the offset memories). Upon the termination of the read mode, each of offset memories 26a and 26b enters inoperative state in which neither read nor write is performed during the subsequent four frames. Thus, offset signals are alternately read from frame memories 26a and 26b at intervals of five frames.

Upon generation of a trigger signal through an operation of console 36, X-rays are emitted in synchronism with the start of the next frame, as is the case with the first embodiment, and selector 24 is switched to the side of subtracter 28 during the next frame interval so that an average offset signal from either offset memory 26a or offset memory 26b is subtracted from a digital image signal from A/D converter 22 and the result of subtraction is written into image memory 30.

As described above, according to the second embodiment, offset signals are averaged over a predetermined number of frames and averaged offset signals are stored in offset memories 26a and 26b; one of which is always set to a read mode. This always permits offset compensation based on average values over several frames, thus preventing an increase in random noise resulting from the offset compensation and the deterioration of S/N ratio of X-ray fluoroscopic images.

Although the preferred embodiments of the present invention have been disclosed and described, it is apparent that other embodiments and modification are possible. For example, use may be made of MOS type solid-state image pickup devices or image pickup tubes. The present invention may be applied to a camera for use with general apparatus as well as an image pickup camera for use with medical apparatus such as X-ray fluoroscopic apparatus. In this case, there is a need for a mechanism for darkening the photoelectric surface of a pickup camera before an object is picked up. Moreover, although the frame averaging circuit of the second embodiment is assumed to have different intervals for obtaining average values and for outputting the average values, the average values may be output upon the completion of calculation of average values in the last frame for averaging. In this case, the offset memories can be alternately set to a write mode at the end of every group of frames over which averaging is made.

As described above, according to the present invention, an offset component can be obtained for each of pixel, thus providing an image pickup camera adapted for accurate offset compensation. If the camera is applied to medical apparatus such as fluoroscopic apparatus, therefore, a frame of offset signals is always written into a memory for each of pixel when X-rays are not emitted, the offset signal read from the memory is subtracted from an image signal from a TV camera for each pixel when X-rays are emitted from an X-ray source, and the results of subtraction are stored in an image memory, thus permitting accurate offset compensation for each pixel of one frame.

What is claimed is:

1. An X-ray fluoroscopic apparatus comprising:
   means for emitting X-rays toward an object to be examined;
   means for converting X-rays transmitted through the object into an optical image;
   means for receiving the optical image, coupled to an output portion of said converting means to allow only light from said converting means to reach said receiving means;
   means for storing one frame of offset signals that correspond to one frame of output from said receiving means when said receiving means does not receive an optical image from said converting means; and
   means for subtracting each of the offset signals stored in said storing means from a corresponding image signal from said receiving means, said receiving means producing a plurality of image signals to form one frame when the optical image is received from said converting means.

2. The apparatus according to claim 1, wherein said converting means includes an image intensifier;
   said receiving means includes a solid-state image pickup device having an array of light receiving elements in a two-dimensional array;
   said storing means stores an offset signal for each of said light receiving elements of said solid-stat image pickup device; and
   said subtracting means subtracts the offset signal for each of said light receiving elements from the output of each of said light receiving elements of said solid-state image pickup device.

3. The apparatus according to claim 2, wherein said storing means includes means for sequentially storing the most recent frame of offset signals output from said receiving means.

4. The apparatus according to claim 3, wherein said storing means includes a selector and an offset signal memory coupled to a first output terminal of said selector, said selector connecting said frame memory to said receiving means when X-rays are not emitted from said means for emitting X-rays, and
   said subtracting means includes a subtracter connected between a second output terminal of said selector and said offset signal memory, said selector connecting said subtracter to said receiving means when X-rays are emitted from said means for emitting X-rays.

5. The apparatus according to claim 2, wherein said storing means includes means for calculating a plurality of average values, each average value based on a plurality of offset signals for each of said light receiving elements over a predetermined number of frames, and average value storing means for storing said plurality of calculated average values over the most recent predetermined number of frames.

6. The apparatus according to claim 5, wherein said storing means further includes a selector connected to the output of said receiving means,
said calculating means includes a frame averaging circuit, connected to a first output terminal of said selector, which outputs the average value during the next predetermined number of frames, and
said average value storing means includes a first and a second offset signal memories, both connected to an output of said frame averaging circuit, said first and second offset signal memories alternately receiving average values from said frame averaging circuit, and
said subtracting means includes a subtracter connected to a second output terminal of said selector and said first and second offset signal memories for subtracting the output of the offset signal memory that is not currently receiving average values from said frame averaging circuit from the output of said selector.

7. The apparatus according to claim 1, wherein said receiving means includes a solid-state image pickup device having an array of light receiving elements in a two-dimensional array, vertical transfer CCDs for said light receiving elements, and a horizontal transfer CCD coupled to the vertical transfer CCDs,
said X-ray emitting means emits X-rays for a period of time less than a frame interval of said solid-state image pickup device,
said storing means includes an offset signal memory which receives offset signal information only when X-rays are not emitted by said X-ray emitting means, and
said subtracting means includes a subtracter for subtracting the output of said offset signal memory from an image signal when X-rays are emitted by said X-ray emitting means, the output of said subtracter being stored in an image memory for subsequent display.

8. A method for offset compensation for use with a solid-state image pickup device, comprising the steps of:
producing a plurality of offset signals by said image pickup device when light is not incident on said image pickup device, each offset signal corresponding to a pixel in a frame of pixels;
storing said plurality of offset signals in an offset signal memory;
producing a plurality of image signals by said image pickup device when an optical image is incident on said image pickup device, each image signal corresponding to a pixel in a frame of pixels; and
subtracting each stored offset signal from the corresponding image signal output from said image pickup device to produce a plurality of resulting image signals with accurate offset compensation.

9. The method according to claim 8, wherein said producing plurality of offset signals step and said storing step are continuously repeated until an optical image is incident on said image pickup device.

10. The method according to claim 8, wherein said producing a plurality of offset signals step comprises the substeps of producing a group of offset signals for each pixel and computing an average value for said group, and
wherein said storing step comprises the substeps of alternately storing said average value in a first offset memory and storing said average value in a second offset memory 11. An image pickup device comprising:
an image pickup camera having its photoelectric surface shielded from external light for producing a frame signal including a plurality of pixels;
means for storing offset signals corresponding to each pixel output from said camera when said photoelectric surface does not receive any light; and
means for subtracting the offset signals stored in said storing means from image signals output from said camera when an optical image of an object falls on the photoelectric surface to produce resulting image signals with accurate offset compensation.

12. The device according to claim 11, wherein said storing means stores offset signals for each frame output from said camera when said photoelectric surface does not receive any light.

13. The device according to claim 11, wherein said storing means comprises:
means for calculating an average offset signal for each pixel based upon a plurality of offset signals output from said camera when said photoelectric surface does not receive any light; and
means for storing the most recently calculated average offset signal.

* * * * *